United States Patent
Takatsuki (10) Patent No.: US 11,659,119 B2
(45) Date of Patent: May 23, 2023

(54) IMAGE PROCESSING APPARATUS WHOSE MAIN BODY IS ELECTRICALLY CONNECTED TO EXPANSION DEVICE, IMAGE PROCESSING METHOD AND NON-TRANSITORY RECORDING MEDIUM

(71) Applicant: KYOCERA Document Solutions Inc., Osaka (JP)

(72) Inventor: Yasushi Takatsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/456,533

(22) Filed: Nov. 24, 2021

(65) Prior Publication Data
US 2022/0174168 A1 Jun. 2, 2022

(30) Foreign Application Priority Data
Nov. 27, 2020 (JP) .............................. JP2020-196663

(51) Int. Cl.
*H04N 1/00* (2006.01)
(52) U.S. Cl.
CPC ..... *H04N 1/00904* (2013.01); *H04N 1/00037* (2013.01); *H04N 1/00888* (2013.01); *H04N 1/00901* (2013.01)
(58) Field of Classification Search
CPC ........... H04N 1/00031; H04N 1/00034; H04N 1/00037; H04N 1/00039; H04N 1/00885; H04N 1/00888; H04N 1/00901; H04N 1/00904; H04N 2201/0094; G06F 3/1229; G03G 15/5004
USPC ................................................ 358/1.13, 1.14
See application file for complete search history.

(56) References Cited

U.S. PATENT DOCUMENTS

| | | | | |
|---|---|---|---|---|
| 2010/0007998 A1* | 1/2010 | Dishman | ................... | H02H 3/42 361/18 |
| 2010/0011234 A1* | 1/2010 | Malik | .................... | G06F 1/3203 363/78 |
| 2013/0187631 A1* | 7/2013 | Russell | ................ | G01R 19/175 324/76.77 |
| 2015/0285872 A1* | 10/2015 | Chung | .............. | H02M 3/33576 324/764.01 |

FOREIGN PATENT DOCUMENTS

JP 2003080804 A 3/2003

* cited by examiner

*Primary Examiner* — Kent Yip
(74) *Attorney, Agent, or Firm* — Alleman Hall Creasman & Tuttle LLP (57) ABSTRACT

An image processing apparatus includes a fluctuation generating portion, and a connection identifying portion. The fluctuation generating portion fluctuates an output power of a power supply portion that supplies power to a load. The connection identifying portion identifies a connection relationship between the power supply portion and the load based on a correlative relationship between a fluctuation of the output power and a fluctuation of the power supplied to the load.

6 Claims, 7 Drawing Sheets

IMAGE PROCESSING APPARATUS WHOSE MAIN BODY IS ELECTRICALLY CONNECTED TO EXPANSION DEVICE, IMAGE PROCESSING METHOD AND NON-TRANSITORY RECORDING MEDIUM

INCORPORATION BY REFERENCE

This application is based upon and claims the benefit of priority from the corresponding Japanese Patent Application No. 2020-196663 filed on Nov. 27, 2020, the entire contents of which are incorporated herein by reference.

The present disclosure relates to an image processing apparatus, an image processing method and a non-transitory recording medium.

BACKGROUND

An image processing apparatus (image forming apparatus) provided with expansion devices (option units) that is detachable from a main body has been known as a related art. In the image processing apparatus according to the related art, power is supplied from a power supply portion to a plurality of loads such as each component of the main body and the expansion devices. Here, the image processing apparatus according to the related art calculates a total power of a system based on power consumption information that is transmitted from each expansion device to the main body, and detects whether the total power exceeds a specified value.

SUMMARY

An image processing apparatus according to one aspect of the present disclosure includes a fluctuation generating portion and a connection identifying portion. The fluctuation generating portion fluctuates an output power of a power supply portion that supplies power to a load. The connection identifying portion identifies a connection relationship between the power supply portion and the load based on a correlative relationship between a fluctuation of the output power and a fluctuation of the power supplied to the load.

An image processing method according to another aspect of the present disclosure includes: fluctuating an output power of a power supply portion that supplies power to a load; and identifying a connection relationship between the power supply portion and the load based on a correlative relationship between a fluctuation of the output power and a fluctuation of the power supplied to the load.

A non-transitory recording medium according to another aspect of the present disclosure is a computer-readable non-transitory recording medium on which a program is recorded, the program for causing one or more processors to execute: fluctuating an output power of a power supply portion that supplies power to a load; and identifying a connection relationship between the power supply portion and the load based on a correlative relationship between a fluctuation of the output power and a fluctuation of the power supplied to the load.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. The following embodiments are examples embodying the present disclosure, and are not intended to limit the technical scope of the present disclosure.

First Embodiment (1) An Overall Configuration of an Image Processing Apparatus Firstly, an overall configuration of an image processing apparatus 10 according to the present embodiment will be described with reference to FIG. 1 to FIG. 3.

The image processing apparatus 10 according to the present embodiment is, as one example, a multifunction peripheral having multiple functions such as a scan function to acquire an image data from an original document, a print function to form an image based on the image data, a facsimile function, and a copy function. The image processing apparatus 10 is simply required to have an image processing function including at least either one of a function to form an image or a function to acquire an image data, and may be a printer, a scanner, a facsimile apparatus, and a copier, for example.

Figure 2:
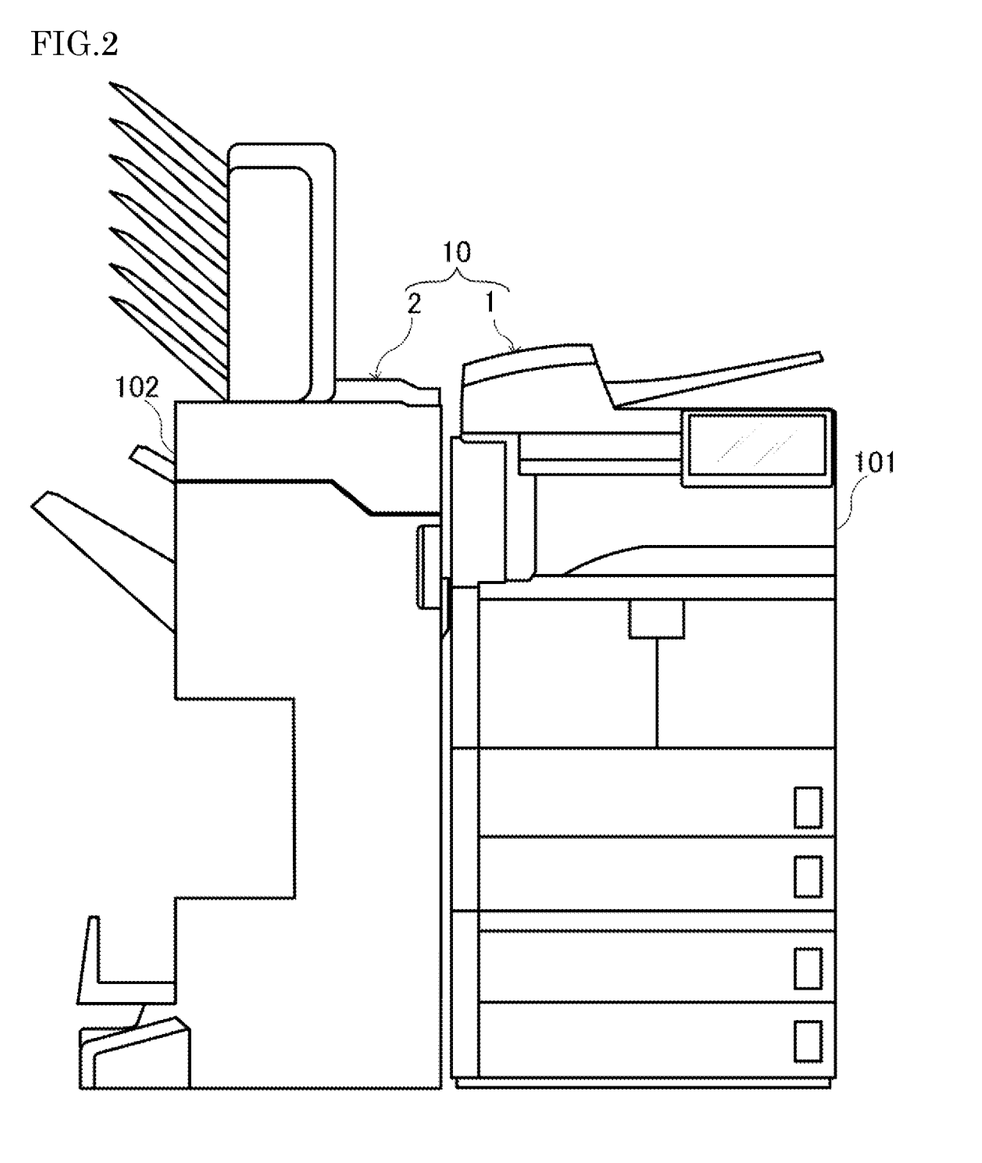
FIG. 2 is a schematic diagram illustrating an appearance of the image processing apparatus according to the first embodiment.

As illustrated in FIG. 2, the image processing apparatus 10 mainly includes a main body 1 (main body unit) and expansion devices 2 (enhance units). The main body 1 has an image processing function (at least either one of the function to form the image or the function to acquire the image data). The "expansion devices" stated in the present disclosure are devices that are detachably connected to the main body 1, and enhances functions by adding various expanded functions to the image processing apparatus. The main body 1 and the expansion devices 2 are electrically and mechanically connected to each other, and used in this state. That is, the image processing apparatus 10 can be achieved by combining the various expanded functions desired by users with the expansion devices 2 desired for the main body 1 on the basis of the functions of the main body 1. The expansion devices 2 may be, as specific examples, devices such as a stapler, a folding machine, an inserter, a booklet folder, and a mail folder. The expansion devices 2 perform a post-processing such as a staple processing on a sheet on which an image is formed in the main body 1, for example.

In the present embodiment, as one example, the image processing apparatus 10 includes a finisher, which is one of the expansion devices 2, having a function as a stapler. The image processing apparatus 10 further includes the expansion devices 2 optionally selected from the folding machine, the inserter, the booklet folder, the mail folder, and the like. That is, it is assumed that, in the image processing apparatus 10 of the present embodiment, as one example, three expansion devices 2 are connected to one main body 1 to which one or more expansion devices 2 can be connected. Hereinafter, for distinguishing the expansion devices 2, one of the expansion devices 2 composed of the finisher may be referred to as an "expansion device 201", and the other expansion devices 2 may be referred to as an "expansion device 202" and an "expansion device 203".

Figure 1:
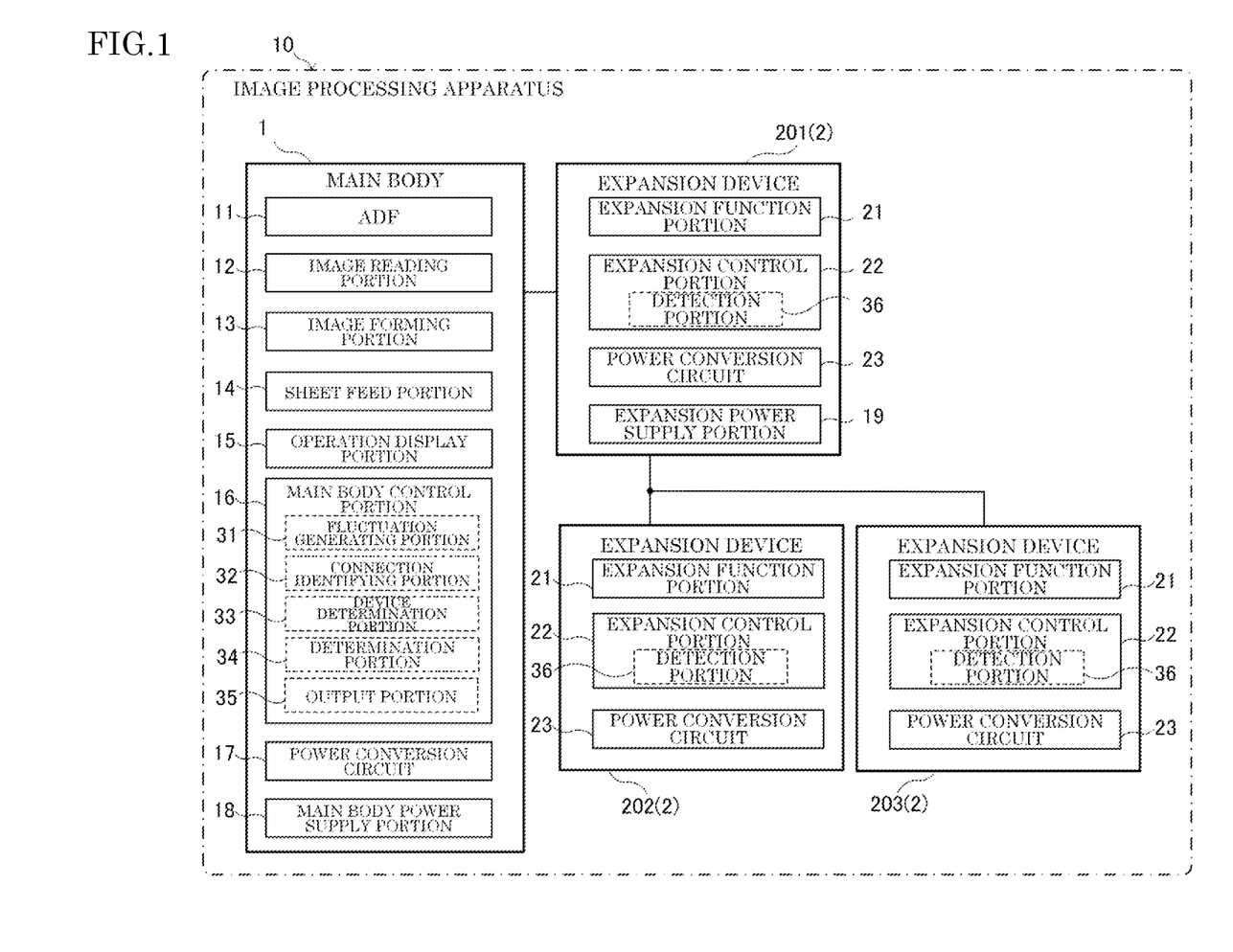
FIG. 1 is a schematic block diagram of an image processing apparatus according to a first embodiment.

As illustrated FIG. 1, the main body 1 includes an automatic document sheet conveying device 11, an image reading portion 12, an image forming portion 13, a sheet feed portion 14, an operation display portion 15, a main body control portion 16, a power conversion circuit 17, and a main body power supply portion 18. The automatic document sheet conveying device 11 corresponds to an ADF (Auto Document Feeder). Therefore, the automatic document sheet conveying device 11 is referred to as the "ADF" in FIG. 1, and also referred to as an "ADF 11" in the following description. In the present embodiment, as illustrated in FIG. 2, the main body 1 includes a housing 101. The ADF 11, the image reading portion 12, the image forming portion 13, the sheet feed portion 14, the operation display portion 15, the main body control portion 16, the power conversion circuit 17, and the main body power supply portion 18 are provided in the housing 101.

The ADF 11 conveys a document sheet on which an image is read by the image reading portion 12. The ADF 11 has a document sheet setting portion, a plurality of conveying rollers, a document sheet holder, a sheet discharge portion, and the like.

The image reading portion 12 reads the image from the document sheet and outputs image data corresponding to the image that has been read. The image reading portion 12 has a document sheet table, a light source, a plurality of mirrors, an optical lens, a CCD (Charge Coupled Device), and the like.

The image forming portion 13 forms the image on a sheet by electrophotography, based on the image data outputted from the image reading portion 12. In addition, the image forming portion 13 forms the image on the sheet based on the image data inputted from an external information processing apparatus of the image processing apparatus 10, such as a personal computer, etc. The image forming portion 13 has four image forming units respectively corresponding to four colors, C (cyan), M (magenta), Y (yellow) and K (black), a laser scanning unit, an intermediate transfer belt, a secondary transfer roller, a fixing device, and the like. The image forming portion 13 may be configured to form the image on the sheet by an image forming method other than electrophotography, for example, by an inkjet method.

The image forming portion 13 forms the image on the sheet by using a toner as a developer. When the image forming portion 13 forms the image by the inkjet method, an ink (another example of the developer) instead of the toner is supplied. The toner supplied to the image forming portion 13 may be, for example, multi-color toners of C (cyan), M (magenta), Y (yellow) and K (black). The sheet after forming the image in the image forming portion 13 is discharged (supplied) to the expansion devices 2 for post-processing.

The sheet feed portion 14 supplies the sheet to the image forming portion 13. The sheet feed portion 14 has a sheet feed cassette, a manual feed tray, a sheet conveyance path, a plurality of conveying rollers, and the like. The image forming portion 13 forms the image on the sheet supplied from the sheet feed portion 14. The sheet supplied to the image forming portion 13 is a paper as one example, but this is not limited to the paper. For example, the sheet may be a resin film or the like.

The operation display portion 15 is a user interface in the image processing apparatus 10. The operation display portion 15 has a display portion such as a liquid crystal display that displays various information in response to control instructions from the main body control portion 16, and an operation portion such as a switch or a touch panel that input various information in the main body control portion 16 in response to operations by a user. The image processing apparatus 10 may also have, for example, a voice output portion and a voice input portion, etc. as the user interface, in addition to or instead of the operation display portion 15.

The main body control portion 16 comprehensively controls the image processing apparatus 10. The main body control portion 16 is composed of mainly a computer system having one or more processors and one or more memories. In the image processing apparatus 10, the one or more processors execute programs, which realizes functions of the main body control portion 16. The programs may be prerecorded in the one or more memories, may be provided through a telecommunication line such as an internet, or may be recorded on a non-temporary recording medium that is readable by a computer system, such as a memory card or an optical disc, and provided. The one or more processors are composed of one or more electronic circuits including semiconductor integrated circuits. Furthermore, the computer system in the present disclosure includes a microcontroller having the one or more processors and the one or more memories. The main body control portion 16 may be a control portion provided separately from a main control portion that comprehensively controls the image processing apparatus 10.

The power conversion circuit 17 converts a voltage that is outputted from the main body power supply portion 18 into a voltage suitable for each component of the main body 1. In the present embodiment, as one example, the power conversion circuit 17 has a DC/DC converter that converts a DC 24V voltage that is outputted from the main body power supply portion 18 into a desired voltage such as DC 3.3V and DC 5V. For the main body control portion 16, the power conversion circuit 17 outputs, for example, the DC 3.3V voltage required for operations of the main body control portion 16. The power conversion circuit 17 has a capacitive element such as an electrolytic capacitor at least on a primary side (input side).

The main body power supply portion 18 is a power supply circuit that generates (outputs) a power for the operations of the image processing apparatus 10. Each component of the main body 1 and each of the plurality of expansion devices 2 are "loads" for the main body power supply portion 18, and the main body power supply portion 18 supplies the power to these loads.

In the present embodiment, as one example, the main body power supply portion 18 is electrically connected to an AC plug 181 (see FIG. 3) and has an AC/DC converter that converts an AC 100V (or 200V) voltage applied to the AC plug 181 into a DC 24V voltage. In other words, in a state in which the AC plug 181 is connected to an outlet, AC power is applied from an AC power source such as a grid power supply to the main body power supply portion 18. Therefore, the main body power supply portion 18 uses such AC power to generate DC power. In the present embodiment, the main body power supply portion 18 that is, for example, a power supply circuit using a switching method, can control operations, from the outside by using a remote signal which will be described later. While the remote signal is "ON", the main body power supply portion 18 executes a switching operation to generate and output the DC power. While the remote signal is "OFF", the main body power supply portion 18 stops the switching operation to stop generation (output) of the DC power.

In addition, the image processing apparatus 10 further includes a storage portion, a communication portion, and the like. The storage portion includes one or more non-volatile memories, and pre-stores information such as a control program for causing the main body control portion 16 to execute various processes. The communication portion is an interface that executes data communication between the image processing apparatus 10 and an external device connected through a communication network such as the internet or LAN (Local Area Network).

In the present embodiment, among a plurality (three in the present embodiment) of expansion devices 201 to 203, the expansion device 201 as the finisher is connected directly to the main body 1. The other two expansion devices 202 and 203 are connected to the expansion device 201, thereby being connected indirectly to the main body 1. That is, when the main body 1 is considered as "parent", the expansion device 201 can be considered as "child" and the expansion devices 202 and 203 can be considered as "grandchild". Thus, arbitrary devices such as the folding machine or the inserter, as the expansion devices 202 and 203 (grandchild enhancements), are combined with the expansion device 201 (child enhancement), which can add arbitrary functions to the finisher. However, the plurality of expansion devices 2 basically adopt a common configuration in the following description. Therefore, in the following description, configurations of the expansion devices 2 will be described referring to the expansion device 201 as an example. Unless otherwise specified, other expansion devices 202 and 203 will have the same configuration.

As illustrated in FIG. 1, each of the expansion devices 2 has an expansion function portion 21, an expansion control portion 22, and a power conversion circuit 23. In the present embodiment, as illustrated in FIG. 2, each expansion device 2 has a housing 102. The expansion function portion 21, the expansion control portion 22 and the power conversion circuit 23 are provided in the housing 102. Here, the plurality of expansion devices 2 may be collectively provided in one housing 102, or the housing 102 may be configured to be dividable (separable) for each expansion device 2.

The expansion function portion 21 realizes a function to add a function as each expansion device 2 to the main body 1. That is, when one of the expansion devices 2 is a stapler, the expansion function portion 21 executes a staple process. When one of the expansion devices 2 is a folding machine, the expansion function portion 21 executes a sheet folding process.

The expansion control portion 22 comprehensively controls each expansion device 2. The expansion control portion 22 is composed of mainly a computer system having one or more processors and one or more memories. In the image processing apparatus 10, the one or more processors execute programs, which realizes functions of the expansion control portion 22. The expansion control portion 22 may be a control portion provided separately from a main control portion that comprehensively controls the expansion devices 2. The expansion control portion 22 can exchange data (signal) between the expansion control portion 22 and the main body control portion 16 of the main body 1 through communication such as serial communication. In addition, the plurality of expansion devices 201 to 203 can exchange data (signal) thereamong, through communication among respective expansion control portion 22.

The power conversion circuit 23 converts a voltage outputted from the main body power supply portion 18 or an expansion power supply portion 19 which will be described later, into a voltage suitable for each portion of the expansion devices 2. In the present embodiment, as one example, the power conversion circuit 23 has a DC/DC converter that converts a DC 24V voltage that is outputted from the main body power supply portion 18 or the expansion power supply portion 19 into a desired voltage such as DC 3.3V and DC 5V. For the expansion control portion 22, the power conversion circuit 23 outputs, for example, the DC 3.3V voltage required for operations of the expansion control portion 22. The power conversion circuit 23 has a capacitive element such as an electrolytic capacitor at least on a primary side (input side).

In the present embodiment, one of the expansion devices 2 has the expansion power supply portion 19. However, the expansion power supply portion 19 is provided only in the expansion device 201 among the plurality of expansion devices 201 to 203. The expansion devices 202 and 203 do not have the expansion power supply portion 19.

The expansion power supply portion 19 is a power supply circuit that generates (outputs) power for the operations of the image processing apparatus 10. The expansion power supply portion 19 is a power supply portion added to the image processing apparatus 10, when the power for the operations of the entire image processing apparatus 10 in which the expansion devices 2 are combined with the main body 1 cannot be covered only by the main body power supply portion 18 of the main body 1. Therefore, the image processing apparatus 10 according to the present embodiment has two power supply portions, the main body power supply portion 18 and the expansion power supply portion 19. As a "power supply portion" for supplying power to the load, the main body power supply portion 18 is provided in the main body 1, and the expansion power supply portion 19 is provided in the expansion device 201. However, the power for the operations of each component of the main body 1 can be covered by the main body power supply portion 18. Therefore, each of the plurality of expansion devices 2 mainly becomes "loads" for the expansion power supply portion 19 unlike the main body power supply portion 18; accordingly, the expansion power supply portion 19 supplies power to these loads.

In the present embodiment, as one example, the expansion power supply portion 19 is electrically connected to an AC plug 191 (see FIG. 3) and has an AC/DC converter that converts an AC 100V (or 200V) voltage applied to the AC plug 191 into a DC 24V voltage. In other words, in a state in which the AC plug 191 is connected to an outlet, AC power is applied from an AC power source such as a grid power supply to the expansion power supply portion 19. Therefore, the expansion power supply portion 19 uses such AC power to generate DC power. In the present embodiment, the expansion power supply portion 19 that is, for example, a power supply circuit using a switching method, can control operations, from the outside by using a remote signal which will be described later.

Figure 3:
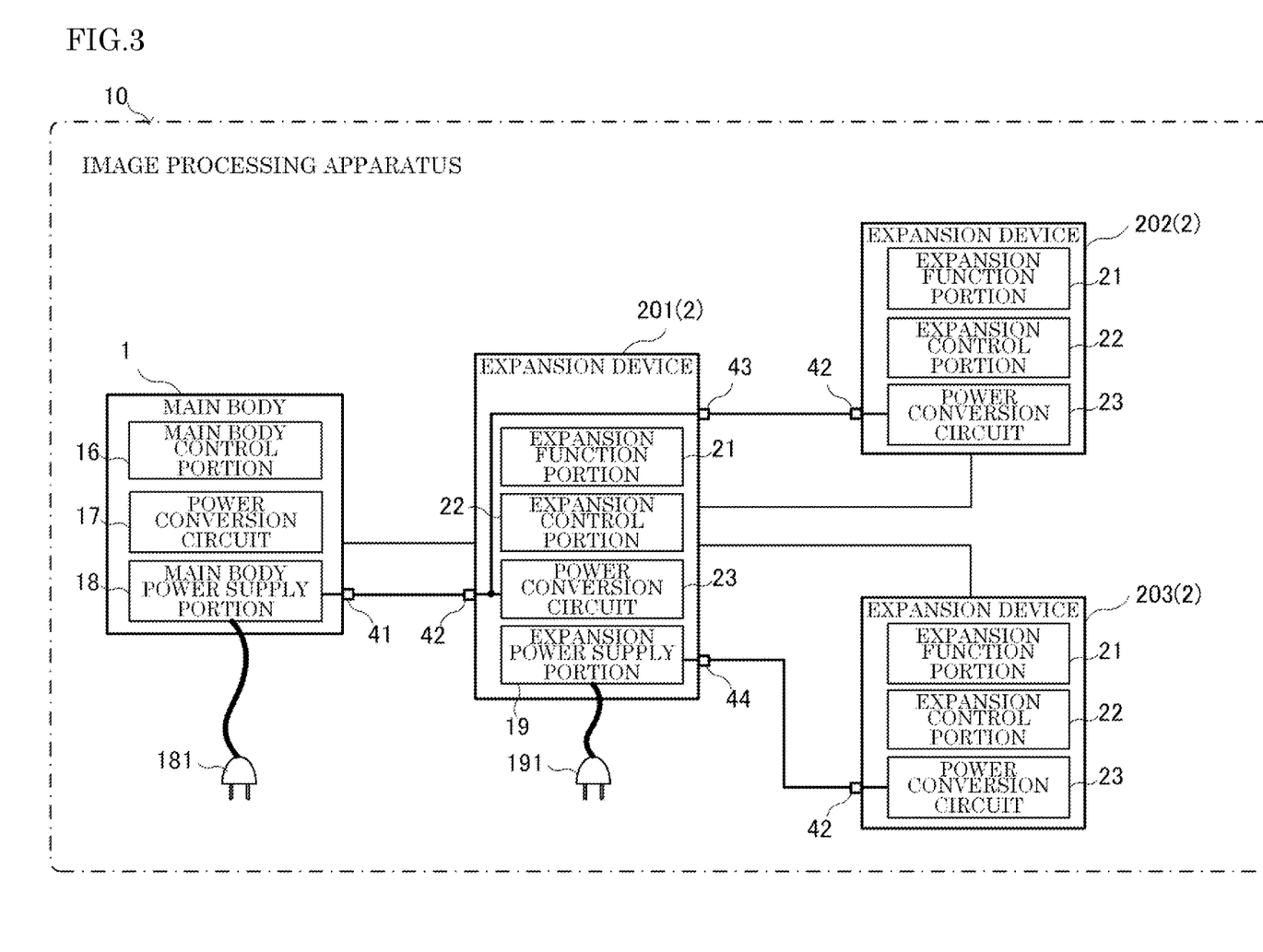
FIG. 3 is a schematic block diagram of the image processing apparatus according to the first embodiment.

FIG. 3 schematically illustrates a connection relationship between the main body 1 and the plurality of expansion devices 201 to 203, and a connection relationship of a power supply passage to be a strong-current system. FIG. 3 does not illustrate the ADF 11, the image reading portion 12, the image forming portion 13, the sheet feed portion 14, the operation display portion 15, and each functional portion (such as a fluctuation generating portion 31, etc.) included in the main body control portion 16, and each functional portion (such as a detection portion 36, etc.) included in the expansion control portion 22.

As illustrated in FIG. 3, the main body 1 includes a power output terminal 41 electrically connected to the main body power supply portion 18. Power (DC 24V) generated in the main body power supply portion 18 is applied to the power output terminal 41. Each of the expansion devices 2 has a power input terminal 42 electrically connected to the power conversion circuit 23. Power (DC 24V) inputted to the power input terminal 42 is applied to the power conversion circuit 23. In addition, the expansion device 201 has a power output terminal 44 electrically connected to the expansion power supply portion 19. Power (DC 24V) generated in the expansion power supply portion 19 is applied to the power output terminal 44. Furthermore, the expansion device 201 has a power supply terminal 43 electrically connected to the power input terminal 42. Power (DC 24V) inputted to the power input terminal 42 is applied to the power supply terminal 43.

As illustrated in FIG. 3, the power input terminal 42 of the expansion device 201 is connected to the power output terminal 41 of the main body 1, thereby being connected to the main body power supply portion 18 of the main body 1. The power input terminal 42 of the expansion device 202 is connected to the power supply terminal 43 of the expansion device 201, thereby being connected to the main body power supply portion 18 of the main body 1 via the expansion device 201. The power input terminal 42 of the expansion device 203 is connected to the power output terminal 44 of the expansion device 201, thereby being connected to the expansion power supply portion 19 of the expansion device 201. The above-described terminals are electrically connected to each other with cables (harnesses), for example. Here, a connection work between each terminal is performed by a user (including contractors such as a service man, etc.) with reference to an instruction manual. That is, in the expansion device 202, for example, the user performs a connection work of connecting the power input terminal 42 to the power supply terminal 43. In the expansion device 203, for example, the user performs a connection work of connecting the power input terminal 42 to the power output terminal 44. As described above, the user performs the connection works such that the power supply portion and the load (including the expansion devices 2) have an appropriate connection relationship in accordance with a configuration (combination) of the expansion device 2 connected to the main body 1.

Then, as a related art of this kind of image processing apparatus 10, an image processing apparatus (image forming apparatus) provided with expansion devices (option units) that are detachable from a main body has been known. In the image processing apparatus according to the related art, power is supplied from a power supply portion to multiple loads such as each component of the main body and the expansion devices. Here, the image processing apparatus according to the related art calculates a total power of a system based on power consumption information that is transmitted from each expansion device to the main body, and detects whether the total power exceeds a specified value.

In a configuration of the above-described related art, the total power may exceed the specified value depending on the number or type of loads connected to the power supply portion. In such a case, for some loads (expansion devices, etc.), power needs to be supplied from an expansion power supply portion that is different from the power supply portion of the main body. However, the image processing apparatus of the related art only detects whether the total power exceeds the specified value. Therefore, even when the power supply portion of the main body, instead of the expansion power supply portion, is incorrectly connected to the expansion devices, such power supply portion may be used as it is.

On the other hand, in the present embodiment, the following configuration realizes the image processing apparatus 10 which easily realizes an appropriate connection relationship between the power supply portion and the loads.

That is, the image processing apparatus 10 according to the present embodiment includes a fluctuation generating portion 31 and a connection identifying portion 32, as illustrated in FIG. 1. The fluctuation generating portion 31 fluctuates an output power of the power supply portion that supplies power to the loads. The connection identifying portion 32 identifies a connection relationship between the power supply portion and the loads based on a correlative relationship between a fluctuation of the output power and a fluctuation of the power supplied to the loads. In the present embodiment, as one example, the fluctuation generating portion 31 and the connection identifying portion 32 are provided in the main body control portion 16 as one of the functions of the main body control portion 16.

In the above-described configuration, the image processing apparatus 10 according to the present embodiment can identify the connection relationship between the power supply portion (which may include the main body power supply portion 18 and the expansion power supply portion 19, etc.) and the loads (which may include each component of the main body 1 and each expansion device 2 etc.). That is, when a certain power supply portion and a certain load are connected to each other, the fluctuation generated in the output power of the certain power supply portion and the fluctuation generated in the power supplied to the certain load have a correlative relationship. Therefore, the connection relationship between the power supply portion and the loads can be identified based on the above-described correlative relationship. In addition, since the connection identifying portion 32 uses the fluctuation of the output power from the power supply portion to the loads in order to identify the connection relationship, it is not necessary to add terminals or the like for connection detection in order to identify the connection relationship. Thus, the connection relationship can be identified with a simple configuration. With the identified connection relationship, suitability of a work for which a user connects the power supply portion and the loads (including the expansion devices 2) can be determined. As described above, in the image processing apparatus 10 according to the present embodiment, there is an advantage in which the appropriate connection relationship between the power supply portion and the loads can be realized.

(2) Configuration for Identifying a Connection Relationship

Next, a configuration for identifying a connection relationship between the power supply portion and the loads will be more specifically described with reference to FIG. 1.

The image processing apparatus 10 according to the present embodiment includes the main body control portion 16 including the fluctuation generating portion 31, the connection identifying portion 32, a device identifying portion 33, a determination portion 34, and an output portion 35. That is, the image processing apparatus 10 includes the device identifying portion 33, the determination portion 34, and the output portion 35 as one of the functions of the main body control portion 16, in addition to the fluctuation generating portion 31 and the connection identifying portion 32. In addition, the image processing apparatus 10 according to the present embodiment includes the detection portion 36 in the expansion control portion 22. That is, the image processing apparatus 10 includes the detection portion 36 as one of the functions of the expansion control portion 22 of the expansion device 2.

The detection portion 36 detects the power supplied to the expansion devices 2, that is, detects at least either one of voltage and current supplied to the expansion devices 2. In the present embodiment, the detection portion 36 detects the voltage of the power input terminal 42 in each expansion device 2. Specifically, the expansion devices 2 divide the voltage of the power input terminal 42 into, for example, ⅛ of the voltage and inputs it to an analog input of the expansion control portion 22 (micro controller). This can monitor the voltage of the power input terminal 42, in the detection portion 36 that is a function of the expansion control portion 22.

The fluctuation generating portion 31 fluctuates an output power of the power supply portion (the main body power supply portion 18 and the expansion power supply portion 19), that is, at least either one of voltage or current outputted by the power supply portion. In the present embodiment, the fluctuation generating portion 31 fluctuates the output power by fluctuating a DC 24V voltage outputted by the power supply portion (the main body power supply portion 18 or the expansion power supply portion 19). Specifically, the fluctuation generating portion 31 fluctuates the output voltage by transmitting a remote signal to the main body power supply portion 18 or the expansion power supply portion 19 and controlling the main body power supply portion 18 or the expansion power supply portion 19 through the remote signal.

In addition, in the present embodiment, the fluctuation generating portion 31 fluctuates the output power by stopping the output of the power supply portion. Specifically, the fluctuation generating portion 31 sets the remote signal to be transmitted to the power supply portion (the main body power supply portion 18 or the expansion power supply portion 19) as an "off signal", and stops a switching operation of the power supply portion thereby stopping the output of the power supply portion. Here, the fluctuation generating portion 31 temporarily stops the output of the power supply portion, and stops the output of the power supply portion at least for a short time enough to continue operations of the expansion control portion 22 of the expansion device 2. However, a fluctuation of the output power by the fluctuation generating portion 31 can be realized by various methods for fluctuating at least one magnitude of the voltage and current outputted by the power supply portion, other than a method for stopping the output of the power supply portion. For example, the fluctuation generating portion 31 may fluctuate the output power of the power supply portion by temporarily reducing (or increasing) the voltage outputted by the power supply portion, or by temporarily reducing (or increasing) the current outputted by the power supply portion.

In the present embodiment, the image processing apparatus 10 includes at least two "power supply portions" that supply power to the loads, the main body power supply portion 18 provided in the main body 1 and the expansion power supply portion 19 provided in the expansion device 201. That is, there are a plurality of power supply portions. When there are the plurality of power supply portions as described above, the fluctuation generating portion 31 preferably fluctuates the output power only in a part of the power supply portions. That is, when the common fluctuation occurs in the output power for all the plurality of power supply portions at the same time, the power supply portion in which the fluctuation has occurred cannot be distinguished in the load (the expansion device 2). Therefore, it is preferable to fluctuate the output power individually for the plurality of power supply portions. In the present embodiment, as one example, it is assumed that the fluctuation generating portion 31 fluctuates the output power only for the main body power supply portion 18 of the main body power supply portion 18 and the expansion power supply portion 19.

When a fluctuation that correlates with a fluctuation of the output power of the power supply portion (the main body power supply portion 18) appears in the supply power, in a load (expansion device 2), the connection identifying portion 32 identifies that a connection destination of such load is the main body power supply portion 18. That is, when a certain power supply portion and a certain load are connected to each other, there is a correlation between the fluctuation that occurs in the output power of the certain power supply portion and the fluctuation that occurs in the supply power of the certain load. With the above-described relationship, the connection identifying portion 32 identifies a connection relationship between the power supply portion and the load. Specifically, the connection identifying portion 32 identifies a correlation regarding a process of the fluctuation of the output power and the supply power, that is, a fluctuation timing, the number of fluctuations, a fluctuation width (including a change amount and amplitude), a length of fluctuation time or fluctuation waveform, etc., or a combination thereamong.

Here, in the present embodiment, the power supply portion includes the main body power supply portion 18 provided in the main body 1 having an image processing function. The load includes the expansion device 2 which is detachable from and electrically connected to the main body 1. That is, the main body power supply portion 18 as the power supply portion supplies power to the expansion device 2 as the load. Therefore, the connection identifying portion 32 can identify at least the connection relationship between the main body power supply portion 18 and the expansion device 2. However, in a case of at least one of the plurality of power supply portions and the plurality of loads, the connection identifying portion 32 need not identify the connection relationship for all the plurality of power supply portions or the plurality of loads. For example, as in the present embodiment, when the power supply portion includes two power supply portions of the main body power supply portion 18 and the expansion power supply portion 19, the connection identifying portion 32 may identify only the connection relationship between the main body power supply portion 18 that is one of the power supply portions, and the load. In addition, as in the present embodiment, when the load includes each component of the main body 1 and the plurality of loads of each expansion device 2, the connection identifying portion 32 may identify only the connection relationship between each expansion device 2 that is a part of loads and the power supply portion.

More specifically, in the present embodiment, a determination threshold and a voltage of the power input terminal 42 in each expansion device 2 are compared in the detection portion 36 during a test period during which the output of the main body power supply portion 18 is stopped by the fluctuation generating portion 31. When the voltage of the power input terminal 42 is equal to or less than the determination threshold during the test period, the connection identifying portion 32 determines that the fluctuation that correlates with the fluctuation of the output power of the main body power supply portion 18 appears in the supply power of the expansion device 2, and identifies that the connection destination of such expansion device 2 is the main body power supply portion 18. The determination threshold is, as one example, ⅓ of a steady state (24V), that is, 8V. Here, in the present embodiment, as described above, the voltage of the power input terminal 42 is divided into ⅛ of the voltage and inputted into the expansion control portion 22 (micro controller). Therefore, the detection portion 36 compares the divided voltage with the threshold value of 1V, thereby comparing with the determination threshold.

Figure 4:
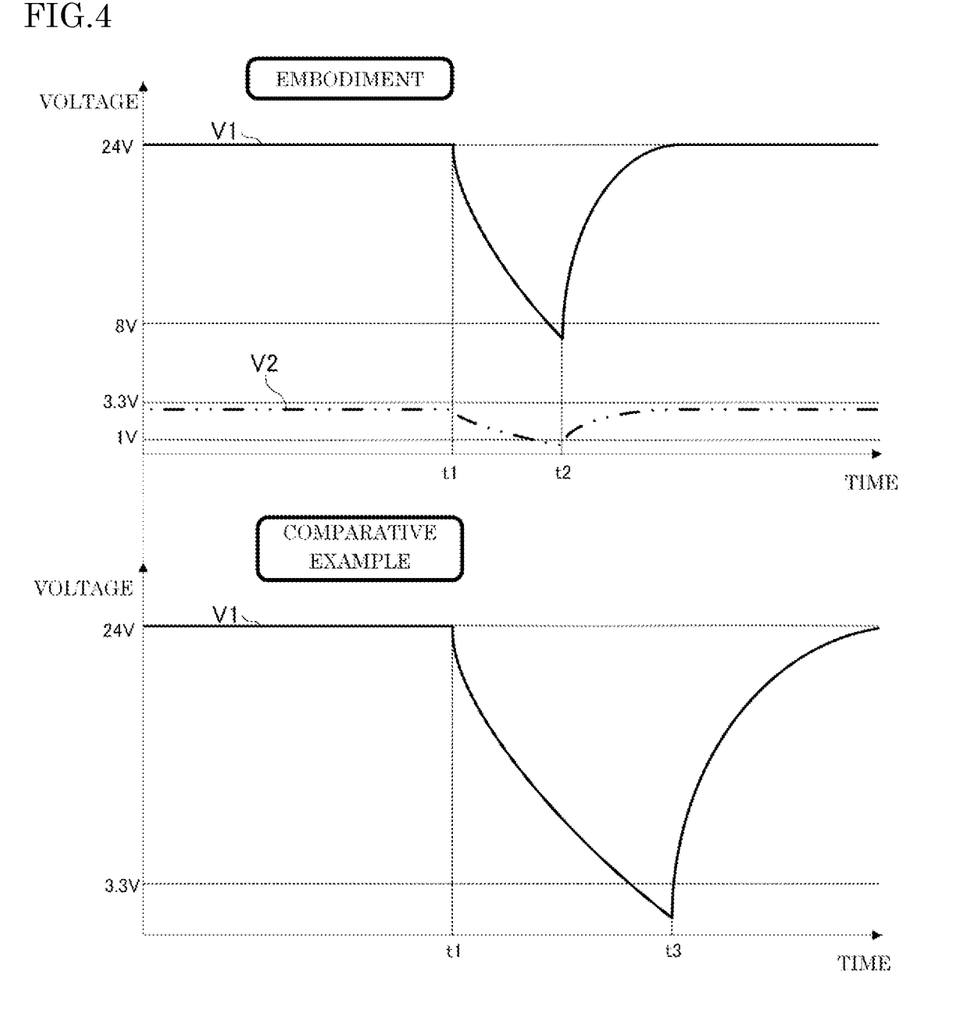
FIG. 4 is an explanatory diagram comparing an operation in the image processing apparatus according to the first embodiment with an operation in the image processing apparatus according to a comparative example.

Here, as illustrated in FIG. 4, a time period during which the fluctuation generating portion 31 stops the output of the power supply portion (the main body power supply portion 18) is a short time enough to continue operations of at least the expansion control portion 22 of the expansion device 2. An operation of the present embodiment is illustrated in an upper part in FIG. 4, and an operation of a comparative example is illustrated in the lower part in FIG. 4. In the comparative example, a time period (t1 to t3) during which the fluctuation generating portion 31 stops the output of the power supply portion is longer than a time period (t1 to t2) during which the fluctuation generating portion 31 stops the output of the power supply portion in the present embodiment.

In the present embodiment, as illustrated in FIG. 4, when a voltage V1 of the power input terminal 42 is equal to or lower than a determination threshold (8V), a voltage V2 after voltage division is equal to or lower than a threshold (1V) during the test period (t1 to t2). Therefore, the connection identifying portion 32 identifies that the connection destination of the expansion device 2 is the main body power supply portion 18. At this time, the voltage V1 of the power input terminal 42 gradually decreases due to an influence of a capacitive element on a primary side of the power conversion circuit 23, and starts to increase before the voltage V1 is equal to or lower than 3.3V. Therefore, the power conversion circuit 23 can maintain the output of the voltage DC 3.3V required for the operation of the expansion control portion 22. As a result, the operation of the expansion control portion 22 can be maintained. On the other hand, in the comparative example, after the voltage V1 of the power input terminal 42 is equal to or lower than the determination threshold (8V); furthermore, the voltage V1 is then equal to or lower than 3.3V during the test period (t1 to t3). Therefore, the power conversion circuit 23 cannot maintain the output of the voltage DC 3.3V required for the operation of the expansion control portion 22. As a result, the operation of the expansion control portion 22 cannot be maintained.

In short, in the present embodiment, the load (the expansion device 2) is provided with the detection portion 36 that detects the supply power. The fluctuation generating portion 31 fluctuates the output power within a continuable range in which at least the detection portion 36 can continue to operate. This can generate the fluctuation for identifying the connection relationship while securing the operation of detecting the supply power in the detection portion 36. In the present embodiment, the "continuable range" referred herein is a time range, that is, a range of the length of time for stopping the output of the power supply portion, but is not limited to this example. For example, the "continuable range" may be a range of the fluctuation width of the output power of the power supply portion, or a combination of the time range and the range of the fluctuation width, and the like.

In addition, in the present embodiment, there are the plurality of power supply portion. Thus, the connection identifying portion 32 identifies at least which of the power supply portions is connected to the load. That is, in a certain load (for example, in the expansion device 201), when the fluctuation that correlates with the fluctuation of the output power of the main body power supply portion 18 appears in the supply power, the connection identifying portion 32 identifies that the certain load is connected to the main body power supply portion 18. On the other hand, in another certain load (for example, in the expansion device 203), when the fluctuation that correlates with the fluctuation of the output power of the main body power supply portion 18 does not appear in the supply power, the connection identifying portion 32 identifies that the certain load is not connected to the main body power supply portion 18, but is connected to the expansion power supply portion 19. As described above, the connection identifying portion 32 can distinguish the plurality of power supply portions (the main body power supply portion 18 and the expansion power supply portion 19) and can identify the connection relationship between the power supply portion and the load.

The device identifying portion 33 identifies the expansion device 2 that is electrically connected to the main body 1. Specifically, the device identifying portion 33 identifies the expansion device 2 through communication between the main body control portion 16 and the expansion control portion 22. As one example, the main body control portion 16 acquires identification information such as MAC (Media Access Control) address from the expansion device 2 through communication with the expansion control portion 22, which can identify the expansion device 2 that is connected to the main body 1. Accordingly, among the various expansion devices 2, a target expansion device 2 that is actually connected to the main body 1 can be identified. This can determine whether the expansion device 2 is correctly connected to the main body 1.

In particular, in the present embodiment, the plurality of expansion devices 2 can be connected to the main body 1. Therefore, the device identifying portion 33 identifies a combination of the plurality of expansion devices 2. As one example, when the plurality of expansion devices 201 to 203 are connected to the main body 1, the device identifying portion 33 can identify a combination of such the plurality of expansion devices 201 to 203. This can determine whether the plurality of expansion devices 2 are correctly connected to the main body 1.

The determination portion 34 determines whether the connection relationship between the expansion device 2 and the power supply portion is correct or incorrect, based on the connection relationship identified by the connection identifying portion 32 and the expansion device 2 identified by the device identifying portion 33. In short, depending on the type of expansion devices 2, due to power consumption, etc., the expansion devices 2 should be connected to the expansion power supply portion 19 instead of the main body power supply portion 18, or should be connected to the main body power supply portion 18 instead of the expansion power supply portion 19. Thus, in the determination portion 34, when each expansion device 2 is connected to the power supply portion to be connected (the main body power supply portion 18 or the expansion power supply portion 19), it is determined that the connection relationship is correct. For example, in an example of FIG. 3, the expansion device 202 should be connected to the main body power supply portion 18, and the expansion device 203 should be connected to the expansion power supply portion 19. The expansion device 2 is identified, which determines the connection relationship between the identified expansion device 2 and an appropriate power supply portion depending on such expansion device 2. Therefore, when the connection relationship identified in the connection identifying portion 32 matches such appropriate connection relationship, the determination portion 34 determines that the connection relationship is correct.

In particular, in the present embodiment, the device identifying portion 33 also identifies a combination of the plurality of expansion devices 2. Therefore, a total power consumption (total current) of the entire image processing apparatus 10 including the plurality of expansion devices 2 can be estimated (calculated). In light of the estimated total power consumption, the determination portion 34 can determine whether only the main body power supply portion 18 can cover the total power consumption or whether the expansion power supply portion 19 is needed. Then, the determination portion 34 can determine whether the connection relationship between the power supply portion (the main body power supply portion 18 and the expansion power supply portion 19) and the load (the expansion device 2) is correct. As described above, correctness of the connection relationship is determined, which can determine whether the user is incorrectly connected.

The output portion 35 outputs a determination result of the determination portion 34. In the present embodiment, as one example, the output portion 35 displays the determination result of correctness of the connection relationship on the operation display portion 15 thereby outputting such determination result. Accordingly, the determination result of correctness of the connection relationship is notified to the user. When the connection relationship is incorrect, reconstruction can be encouraged. A mode of the output of the determination result by the output portion 35 is not limited to displaying on the operation display portion 15. For example, the mode of the output of the determination result may be controlling of each component of the main body 1 (emergency stop, etc.), transmission to external devices, writing into a non-temporary readable recording medium in a computer system, displaying by a lighting state of an indicator lamp, printing of a report, output of a notification sound (including audio), or a combination thereamong.

[3] Image Processing Method

Figure 5:
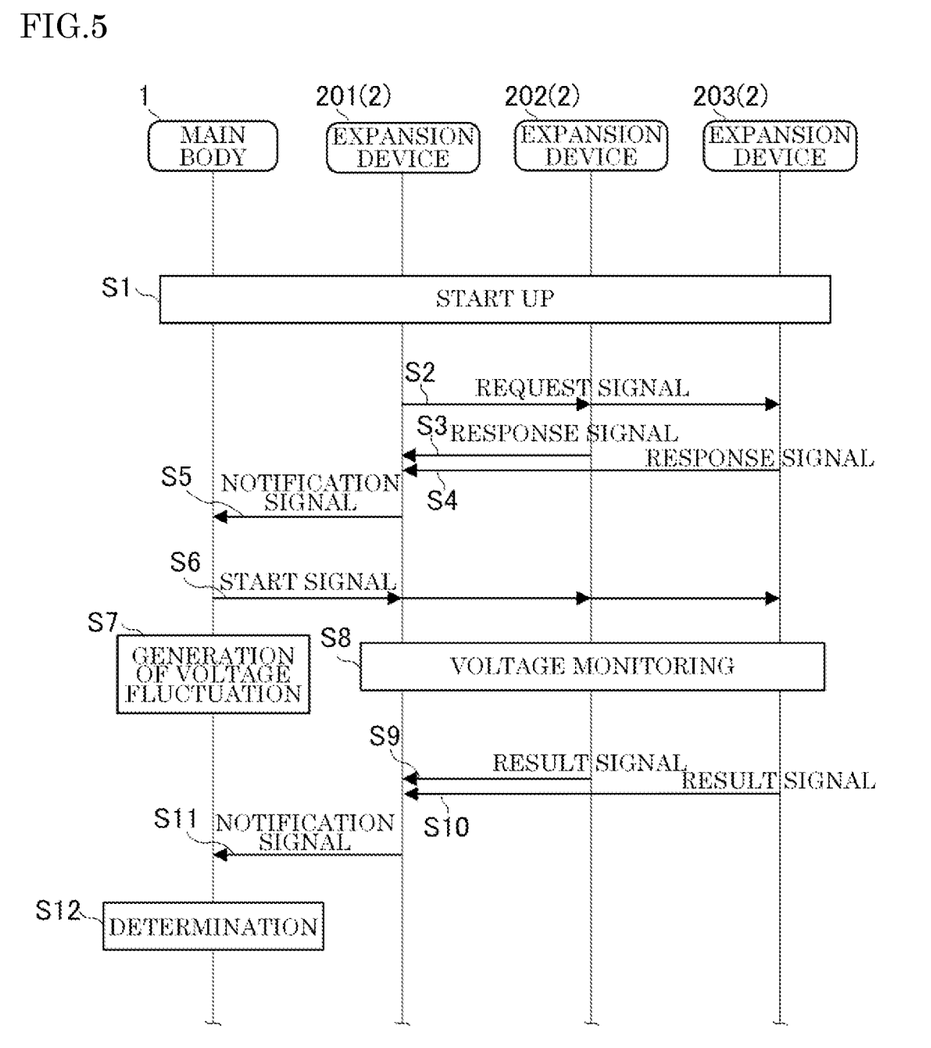
FIG. 5 is a sequence diagram of an operation example of the image processing apparatus according to the first embodiment.
Figure 6:
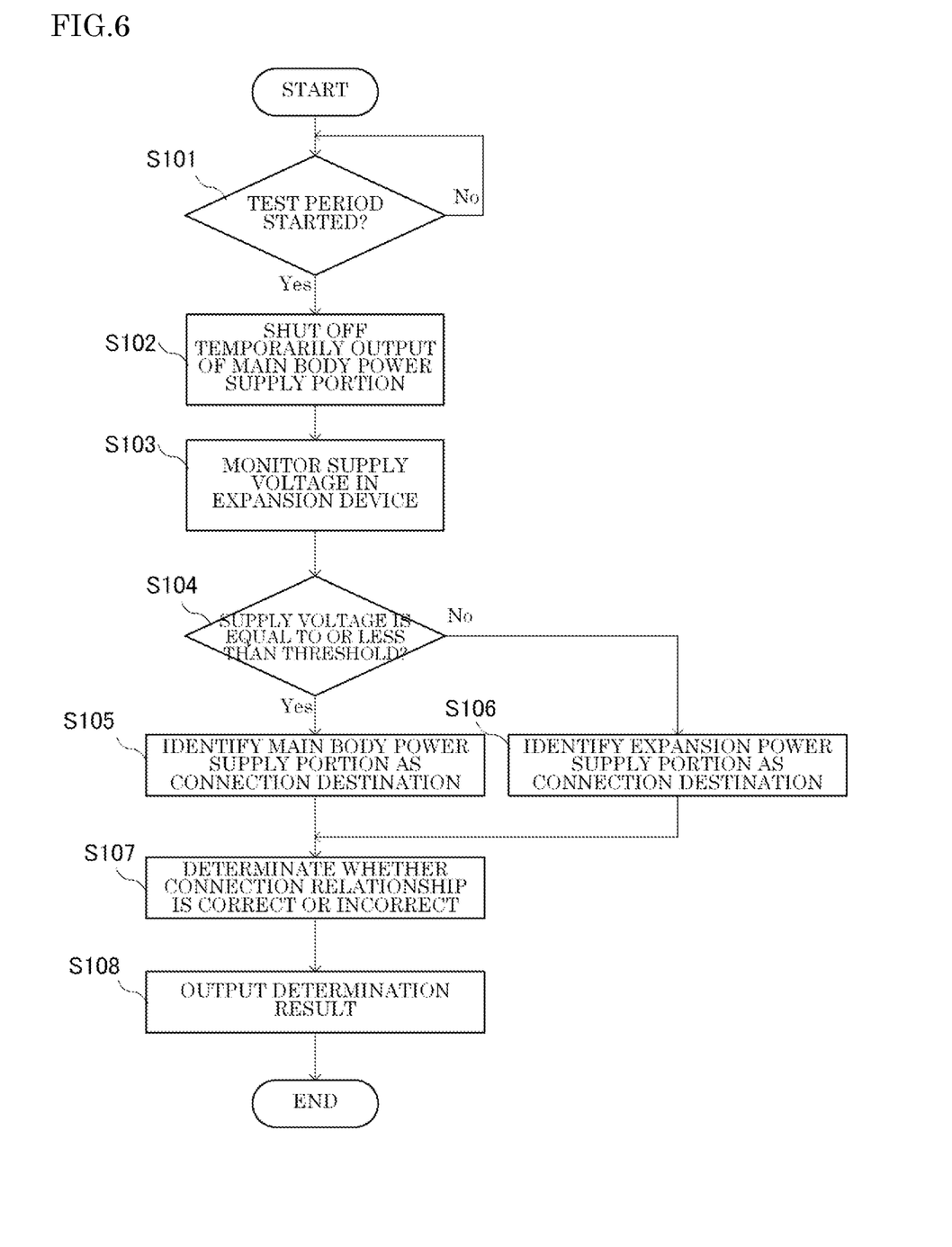
FIG. 6 is a flowchart of the operation example of the image processing apparatus according to the first embodiment.

Hereinafter, in the image processing method executed in the image processing apparatus 10, an example of steps of identifying the connection relationship between the power supply portion and the load will be described with reference to FIG. 5 and FIG. 6. Here, Steps S1, S2 . . . in the sequence diagram illustrated in FIG. 5 and Steps S101, S102 . . . in the flowchart illustrated in FIG. 6 represent numbers of processing steps executed by the image processing apparatus 10. The following operation for identifying the connection relationship between the power supply portion and the load is executed, as one example, immediately after the user completes a set-up including a connection work and turns on the power, that is, during a certain period immediately after first energization to the power supply portion.

In the present embodiment, signals are transmitted and received between the main body 1 and the expansion device 2 through communication between the main body control portion 16 and the expansion control portion 22. Signals are transmitted and received among the plurality of expansion devices 2 through communication between the expansion control portions 22. In addition, in the present embodiment, the expansion devices 202, 203 (grandchild enhancement) are connected to the main body 1 via the expansion device 201 (child enhancement). Then, for the plurality of expansion devices 201 to 203, information for identifying the target expansion device 2 and information for identifying the connection relationship between the target expansion device 2 and the power supply portion are aggregated in the expansion device 201 and transmitted to the main body 1. That is, the expansion device 201 functions as an aggregator for the plurality of expansion devices 201 to 203.

<Operation Sequence>

Firstly, an overall step of operations for identifying the connection relationship between the power supply portion and the load will be described with reference to FIG. 5. When the user completes a set-up and turns on the power, the main body 1 and the plurality of expansion devices 201 to 203 are started (S1). Subsequently, the expansion device 201 transmits a request signal for requesting identification information for identifying the expansion devices 202, 203, to the expansion devices 202, 203 (S2). The expansion devices 202, 203 respectively transmit a response signal including the identification information for each of the expansion devices 202, 203 to the expansion device 201 as a response to the request signal (S3, S4). The expansion device 201 aggregates the identification information of the plurality of expansion devices 201 to 203, and transmits a notification signal including the information for identifying the expansion device 2 connected to the main body 1 to the main body 1 (S5).

For the main body 1 that has received the notification signal in Step S5, the device identifying portion 33 identifies the expansion device 2 that is electrically connected to the main body 1, based on the information included in the notification signal. Subsequently, the main body 1 transmits a start signal for notifying that the test period for the fluctuation of the output power is started, to the plurality of expansion devices 201 to 203 (S6). When a predetermined time (about several seconds) elapsed after transmission of the start signal, in the main body 1, the fluctuation generating portion 31 temporarily stops the output of the main body power supply portion 18 to generate a fluctuation of an output voltage (S7). On the other hand, each of the expansion devices 201 to 203 that has received the start signal monitors supply voltage (voltage of the power input terminal 42) in the detection portion 36 after the predetermined time (about several seconds) elapsed (S8).

When the test period ends, each of the expansion devices 202, 203 transmits a result signal including a comparison result between the supply voltage (voltage of the power input terminal 42) and the determination threshold, to the expansion device 201 during the test period (S9, S10). The expansion device 201 aggregates comparison results between the supply voltage in the expansion devices 201 to 203 and the determination threshold, and transmits a notification signal including the information for identifying the connection relationship between the expansion devices 201 to 203 and the power supply portion, to the main body 1 (S11).

In the main body 1 that has received the notification signal in Step S11, the connection identifying portion 32 identifies the connection relationship between the power supply portion and the loads (the expansion devices 201 to 203) based on the information included in the notification signal. Subsequently, in the main body 1, the determination portion 34 determines whether the connection relationship of the expansion device 2 with respect to the power supply portion is correct or incorrect, based on the connection relationship identified in the connection identifying portion 32 and the expansion device 2 identified in the device identifying portion 33 (S12).

<Flowchart>

Next, details of processing steps after transmission of the start signal (S6) will be described with reference to the flowchart of FIG. 6.

<Step S101>

In Step S101, the main body control portion 16 of the main body 1 and the expansion control portion 22 of each expansion device 2 each determines whether the test period has started. The image processing apparatus 10 counts a time period elapsed from transmission and reception of the start signal, and determines that the test period is started when such elapsed time period reaches a predetermined time (S101: Yes). Then, the process is shifted to Step S102. On the other hand, when the time period elapsed from transmission and reception of the start signal has not reached the predetermined time, the image processing apparatus 10 determines that the test period has not started (S101: No). Then, the process is shifted to Step S101.

<Steps S102, 103>

In Step S102, in the image processing apparatus 10, the fluctuation generating portion 31 temporarily shuts off (stops) the output of the main body power supply portion 18 during the test period, thereby causing a fluctuation in the output voltage of the main body power supply portion 18. In Step S103, in the image processing apparatus 10, the detection portion 36 of each expansion device 2 monitors the supply voltage (voltage of the power input terminal 42) during the test period, and compares the supply voltage with the determination threshold.

<Steps S104 to S106>

In Step S104, the image processing apparatus 10 determines, in the connection identifying portion 32, whether the supply voltage is equal to or less than the determination threshold during the test period, from a comparison result between the supply voltage in each expansion device 2 and the determination threshold. Here, when the supply voltage is equal to or less than the determination threshold (S104: Yes), the connection identifying portion 32 considers that a fluctuation that correlates with a fluctuation of the output power of the main body power supply portion 18 appears in the supply power of the expansion device 2, and identifies the connection destination of the expansion device 2 as the main body power supply portion 18 (S105). On the other hand, when the supply voltage is not equal to or not less than the determination threshold (S104: No), the connection identifying portion 32 considers that the fluctuation that correlates with the fluctuation of the output power of the main body power supply portion 18 does not appear in the supply power of the expansion device 2, and identifies that the connection destination of the expansion device 2 is the expansion power supply portion 19 (S106).

<Steps S107, 108>

In Step S107, in the image processing apparatus 10, the determination portion 34 determines whether the connection relationship between the expansion device 2 and the power supply portion is correct or incorrect. At this time, the determination portion 34 determines correctness based on the connection relationship identified in the connection identifying portion 32 and the expansion device 2 identified in the device identifying portion 33. In an example of FIG. 3, when the expansion device 203 is incorrectly connected to the main body power supply portion 18 but correctly should be connected to the expansion power supply portion 19, the determination portion 34 determines that the connection relationship is incorrect. In Step S108, in the image processing apparatus 10, the output portion 35 outputs the determination result of the determination portion 34, that is, the determination result of the correctness of the connection relationship by displaying it on the operation display portion 15.

The steps of the image processing method as described above is only an example. The order of processes illustrated in the flowchart in FIG. 6 may be changed as appropriate.

As described above, the image processing apparatus 10 according to the present embodiment can identify the connection relationship between the power supply portion (which may include the main body power supply portion 18 and the expansion power supply portion 19 and the like) and the load (which may include each component of the main body 1 and each expansion device 2 and the like). Thus, an appropriate connection relationship between the power supply portion and the load is easily achieved. In addition, the operation for identifying the connection relationship between the power supply portion and the load is performed only immediately after the user completes the set-up including the connection work and turns on the power; therefore, the delay is unlikely to occur at a time of normal startup. Furthermore, when only a specific operation of the connection relationship between the power supply portion and the load is performed, it is not necessary to operate the expansion function portion 21 of the expansion device 2. Thus, the power consumption of the image processing apparatus 10 can be covered only by the output power of the main body power supply portion 18. Therefore, even when the necessary expansion power supply portion 19 is not incorrectly connected, the operation of identifying the connection relationship between the power supply portion and the load is unlikely to be hindered.

[4] Modification

The plurality of components included in the image processing apparatus 10 may be distributed in a plurality of housings. For example, at least one of the fluctuation generating portion 31, the connection identifying portion 32, the device identifying portion 33, the determination portion 34, and the output portion 35 need not to be configured as one function of the main body control portion 16, and may be provided separately from the main body control portion 16 or may be provided in the expansion device 2 or the like other than the main body 1.

In addition, a configuration of the fluctuation generating portion 31 is not limited to a configuration in which the operation (switching operation) of the main body power supply portion 18 is controlled by the remote signal, and may be a configuration in which the output power of the main body power supply portion 18 is fluctuated. For example, the fluctuation generating portion 31 fluctuates the output power of the main body power supply portion 18 by opening and closing a relay provided between the output of the main body power supply portion 18 and the power output terminal 41 of the main body 1.

In addition, the fluctuation generating portion 31 need not to fluctuate the output power of the main body power supply portion 18, and may fluctuate the output power of the expansion power supply portion 19. In this case, in the load (expansion device 2), when a fluctuation that correlates with a fluctuation of the output power of the power supply portion (expansion power supply portion 19) appears in the supply power, the connection identifying portion 32 identifies that the connection destination of the load is the expansion power supply portion 19. In addition, the fluctuation generating portion 31 may respectively fluctuate, at different timings, the output power of the main body power supply portion 18 and the output power of the expansion power supply portion 19, or may generate fluctuation with different amplitudes or time lengths. Three or more power supply portions are acceptable.

In addition, the operation for identifying the connection relationship between the power supply portion and the load may be performed not only immediately after the user completes the set-up including the connection work and turns on the power, but also at other timings. For example, a predetermined operation by the user or energization to an expansion load may be set as a trigger to start the operation for identifying the connection relationship between the power supply portion and the load.

Second Embodiment

Figure 7:
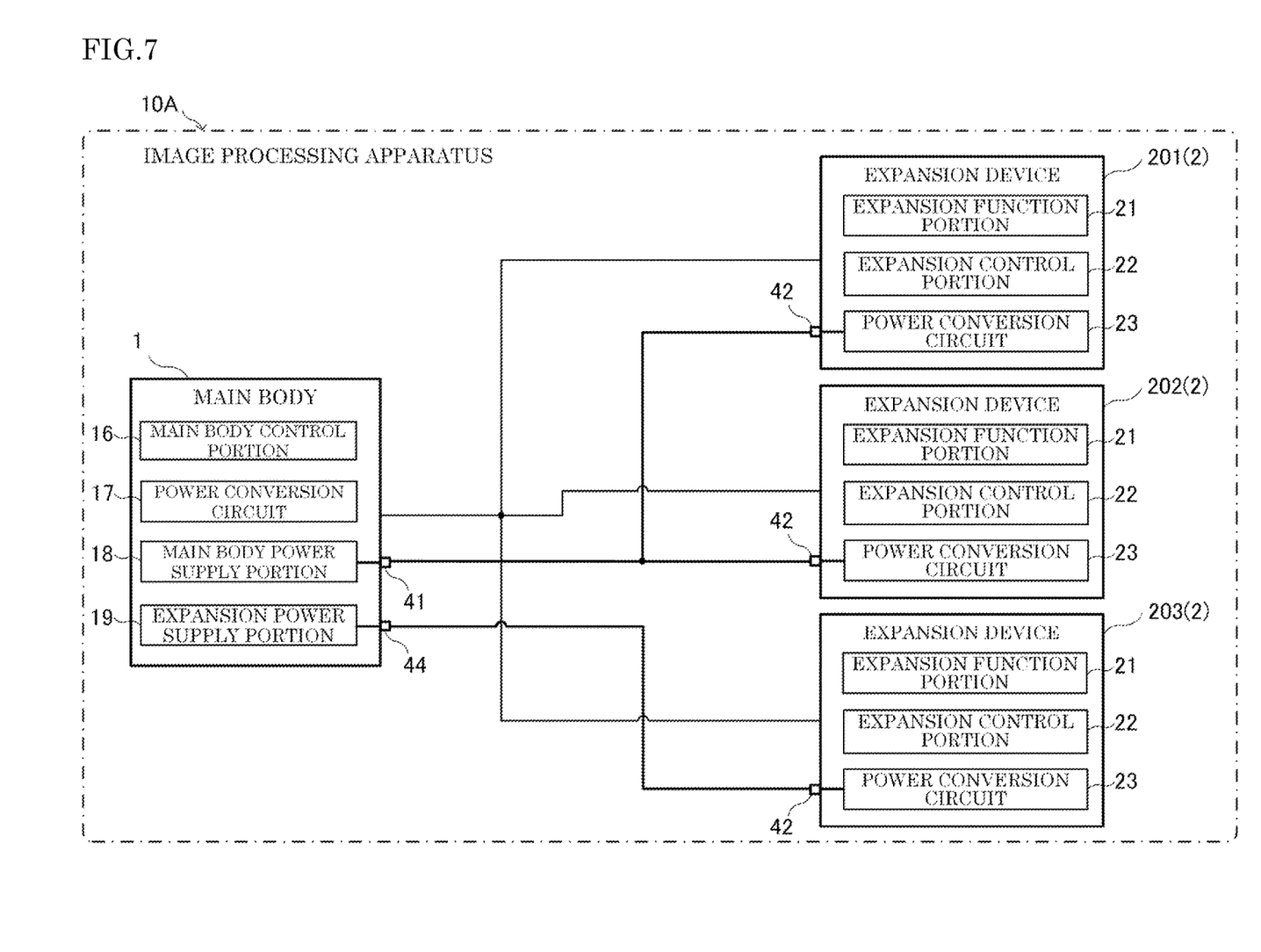
FIG. 7 is a schematic block diagram of an image processing apparatus according to a second embodiment.

As illustrated in FIG. 7, in an image processing apparatus 10A according to the present embodiment, a connection relationship between the main body 1 and the expansion device 2 is different from that of the image processing apparatus 10 according to the first embodiment. In FIG. 7, as with FIG. 3, the ADF 11 and the like are not illustrated as necessary. Hereinafter, the same configuration as that of the first embodiment has the common reference numerals, and the description is appropriately omitted.

In the present embodiment, the plurality of (three in the present embodiment) expansion devices 201 to 203 are directly connected to the main body 1, as child enhancement. The expansion power supply portion 19 is provided in the main body 1, not in the expansion device 201. That is, the main body 1 has both the main body power supply portion 18 and the expansion power supply portion 19, and has the power output terminal 44 connected to the expansion power supply portion 19 in addition to the power output terminal 41 connected to the main body power supply portion 18.

As illustrated in FIG. 7, the power input terminals 42 of the expansion device 201 and the expansion device 202 are each connected to the power output terminal 41 of the main body 1, thereby being connected to the main body power supply portion 18. The power input terminal 42 of the expansion device 203 is connected to the power output terminal 44 of the main body 1, thereby being connected to the expansion power supply portion 19.

Also in the image processing apparatus 10A according to the present embodiment, the main body 1 has the fluctuation generating portion 31 and the connection identifying portion 32. The fluctuation generating portion 31 fluctuates the output power of the power supply portion that supplies the power to the load. The connection identifying portion 32 identifies the connection relationship between the power supply portion and the load based on the correlative relationship between a fluctuation of the output power and a fluctuation of the power supplied to the load.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising one or more processors configured to:
fluctuate an output power of a power supply circuit that supplies power to a load;
identify a connection relationship between the power supply circuit and the load based on a correlative relationship between a fluctuation of the output power and a fluctuation of the power supplied to the load;
identify an expansion device electrically connected to a main body; and
determine whether a connection relationship between the expansion device and the power supply circuit is correct or incorrect, based on the identified connection relationship and the identified expansion device, wherein
the power supply circuit has a main body power supply circuit provided in the main body having an image processing function,
the load has an expansion device electrically and detachably connected to the main body,
a plurality of expansion devices are configured to connect to the main body,
the one or more processors are configured to identify a combination of the plurality of expansion devices, and
the one or more processors are configured to estimate a total power consumption of an entire image processing apparatus including the plurality of expansion devices whose combination is identified, and determine, in light of the total power consumption, whether the connection relationship is correct or incorrect.

2. The image processing apparatus according to claim 1, wherein
the power supply circuit is one of a plurality of power supply circuits,
the plurality of power supply circuits is provided, and
the one or more processors are configured to identify at least which one of the plurality of power supply circuits is connected to the load.

3. The image processing apparatus according to claim 1, wherein
the one or more processors are configured to fluctuate the output power by stopping an output of the power supply circuit.

4. The image processing apparatus according to claim 1, wherein
the load has a controller configured to detect the power, and
the one or more processors are configured to fluctuate the output power within a range in which at least the controller is configured to continue to operate.

5. An image processing method comprising:
fluctuating an output power of a power supply circuit that supplies power to a load;
identifying a connection relationship between the power supply circuit and the load based on a correlative relationship between a fluctuation of the output power and a fluctuation of the power supplied to the load;

identifying an expansion device electrically connected to a main body; and determining whether a connection relationship between the expansion device and the power supply circuit is correct or incorrect, based on the identified connection relationship and the identified expansion device, wherein the power supply circuit has a main body power supply circuit provided in the main body having an image processing function, the load has the expansion device electrically and detachably connected to the main body, a plurality of expansion devices are configured to be connected to the main body, and in determining whether the connection relationship is correct or incorrect, a combination of the plurality of expansion devices is identified, a total power consumption of an entire image processing apparatus including the plurality of expansion devices whose combination is identified is estimated, and it is determined, in light of the total power consumption, whether the connection relationship is correct or incorrect.

6. A computer-readable non-transitory recording medium on which a program is recorded, wherein the program for causing one or more processors to execute:

fluctuating an output power of a power supply circuit that supplies power to a load;

identifying a connection relationship between the power supply circuit and the load based on a correlative relationship between a fluctuation of the output power and a fluctuation of the power supplied to the load;

identifying an expansion device electrically connected to a main body; and determining whether a connection relationship between the expansion device and the power supply circuit is correct or incorrect, based on the identified connection relationship and the identified expansion device, wherein the power supply circuit has a main body power supply circuit provided in the main body having an image processing function, the load has the expansion device electrically and detachably connected to the main body, a plurality of expansion devices are configured to be connected to the main body, and in determining whether the connection relationship is correct or incorrect, a combination of the plurality of expansion devices is identified, a total power consumption of an entire image processing apparatus including the plurality of expansion devices whose combination is identified is estimated, and it is determined, in light of the total power consumption, whether the connection relationship is correct or incorrect.

* * * * *